United States Patent
Kim et al.

(10) Patent No.: US 7,683,579 B2
(45) Date of Patent: Mar. 23, 2010

(54) METHOD AND APPARATUS OF CONTROLLING FOR CHARGE/DISCHARGE POWER OF BATTERY

(75) Inventors: Do Youn Kim, Daejeon (KR); Do Yang Jung, Hwaseong-si (KR)

(73) Assignee: LG Chem, Ltd. (KR)

( * ) Notice: Subject to any disclaimer, the term of this patent is extended or adjusted under 35 U.S.C. 154(b) by 277 days.

(21) Appl. No.: 11/452,844

(22) Filed: Jun. 14, 2006

(65) Prior Publication Data

US 2006/0284614 A1    Dec. 21, 2006

(30) Foreign Application Priority Data

Jun. 14, 2005    (KR) ...................... 10-2005-0050972

(51) Int. Cl.
- *H02J 7/00* (2006.01)
- *G01R 31/36* (2006.01)
- *G01N 27/416* (2006.01)

(52) U.S. Cl. .................. 320/132; 324/427; 702/63

(58) Field of Classification Search ............... 320/106, 320/112, 114, 132, 134, 135, 136, DIG. 19, 320/DIG. 21; 324/149, 426, 427, 428, 429, 324/430; 703/63; 340/636.1, 636.12, 636.15, 340/636.16, 636.17, 636.18, 636.19
See application file for complete search history.

(56) References Cited

U.S. PATENT DOCUMENTS

| | | | | |
|---|---|---|---|---|
| 5,363,031 A | * | 11/1994 | Miller et al. | 320/115 |
| 5,896,025 A | * | 4/1999 | Yamaguchi et al. | 320/134 |
| 6,208,117 B1 | * | 3/2001 | Hibi | 320/134 |
| 6,300,763 B1 | * | 10/2001 | Kwok | 324/427 |
| 6,417,668 B1 | | 7/2002 | Howard et al. | |
| 6,509,718 B2 | * | 1/2003 | Sakai et al. | 320/134 |
| 6,930,466 B2 | * | 8/2005 | Bradley et al. | 320/133 |
| 7,315,789 B2 | * | 1/2008 | Plett | 702/63 |
| 7,321,220 B2 | * | 1/2008 | Plett | 320/128 |
| 7,514,902 B2 | | 4/2009 | Tsuchiya et al. | |
| 2003/0097225 A1 | * | 5/2003 | Teruo | 702/63 |
| 2005/0035742 A1 | | 2/2005 | Koo et al. | |
| 2005/0083017 A1 | | 4/2005 | Suzuki | |
| 2006/0103348 A1 | * | 5/2006 | Melichar | 320/116 |

FOREIGN PATENT DOCUMENTS

| | | |
|---|---|---|
| CN | 1547282 | 11/2004 |
| CN | 1616982 | 5/2005 |
| JP | 2004-266917 | 9/2004 |
| JP | 2005-124353 | 5/2005 |

\* cited by examiner

*Primary Examiner*—Edward Tso
*Assistant Examiner*—M'Baye Diao
(74) *Attorney, Agent, or Firm*—Colburn, LLP

(57) ABSTRACT

Disclosed is an apparatus and method for controlling the discharge or charge power of a battery, capable of preventing over-charge and over-discharge of battery cells according to states of the battery cells, and solving a problem that the lifetime of a conventional battery pack is rapidly reduced due to the over-charge or over-discharge of some cells of the battery pack. The method includes the steps of estimating the maximum power of the battery, measuring voltage of a battery cell or pack, checking whether or not the voltage of the battery cell or pack deviates from a preset limited range so as to correspond to the maximum power, and when the voltage of the battery cell or pack deviates from a preset limited range, controlling the discharge or charge power of the battery.

6 Claims, 6 Drawing Sheets

METHOD AND APPARATUS OF CONTROLLING FOR CHARGE/DISCHARGE POWER OF BATTERY

TECHNICAL FIELD

The present invention relates to a method for controlling a power limit according to states of battery cells in order to prevent over-charge and over-discharge of the battery cells used in hybrid electric vehicles (HEVs).

BACKGROUND ART

In general, hybrid electric vehicles (HEVs) are mounted with a battery pack in which several tens of battery cells are connected in series. The maximum available charge and discharge powers of the battery pack are controlled on the basis of a state of charge (SOC) and temperature of the battery pack. An example of determining the maximum available charge and discharge powers of the battery pack will be described below on the basis of conventional charge and discharge control using characteristic modeling of the battery constituted of charge and discharge internal resistances.

First, since the internal resistances of the battery pack are changed depending on the SOC and temperature of the battery pack, they are measured at each temperature for each SOC through a test. In a method of measuring the internal resistances, when current flows through the battery pack, a value dividing a variation of voltage by the current is determined as a value of internal resistance. The obtained internal resistance value is stored in a memory. Real power of the battery pack is estimated through the internal resistance according to Equation (1).

$$P = I \times \Delta V = \frac{\Delta V}{R} \times \Delta V = \frac{\Delta V^2}{R} \quad (1)$$

$$\Delta V = V_{LIMIT} - V_{CURRENT}$$

In Equation (1), the negative value becomes discharge power, but the positive value becomes charge power. Further, the internal resistance R is to call up the internal resistance value stored in the memory according to the SOC and temperature of each state, and then substitute the internal resistance value into the Equation (1).

Meanwhile, each battery cell has the same performance when initially mounted to a vehicle, and thus the power of a motor for the vehicle is controlled on the basis of the maximum power of the battery pack.

However, as the mileage of the vehicle increases, performance deviation is generated between the battery cells. Nevertheless, when charging and discharging processes continue to be performed on the basis of the initial maximum power of the battery pack, some battery cells are charged or discharged in excess of available charge or discharge power, as shown in FIG. 1.

In this manner, because the power of the vehicular motor is continuously controlled on the basis of the initial maximum power of the battery pack, some degraded battery cells are over-charged or over-discharged during operation of the vehicle. This results in the acceleration of the performance deviation between the battery cells, thereby sharply reducing a lifetime of the battery pack.

DISCLOSURE OF THE INVENTION

Therefore, the present invention has been made in view of the above-mentioned problems, and it is an objective of the present invention to provide an apparatus and method capable of preventing over-charge and over-discharge of battery cells according to states of the battery cells in order to solve a problem that the lifetime of a conventional battery pack is rapidly reduced due to the over-charge or over-discharge of some cells of the battery pack.

According to an aspect of the present invention, there is provided a method for controlling the discharge or charge power of a battery. The method includes the steps of estimating the maximum power of the battery, measuring voltage of a battery cell or pack, checking whether or not the voltage of the battery cell or pack deviates from a preset limited range so as to correspond to the maximum power, and when the voltage of the battery cell or pack deviates from a preset limited range, controlling the discharge or charge power of the battery.

BEST MODE FOR CARRYING OUT THE INVENTION

Reference will now be made in detail to the exemplary embodiments of the present invention.

The present invention estimates the maximum power of a battery, and adjusts charge and discharge power of the battery using the estimated maximum power and the voltage of the battery.

First, a description will be made regarding a process of deriving a calculation formula for estimating the maximum power of the battery according to an exemplary embodiment of the present invention.

A tester measures the maximum charge and discharge power of the battery depending on a state of charge (SOC) of at least one battery by which a vehicle can be driven, and then detects the correlation between the SOC and the maximum charge and discharge power.

Subsequently, the tester measures the maximum power of the battery at a plurality of temperatures at which the vehicle can be driven, and then detects the correlation between the maximum power and the temperature. The tester measures a degradation rate of the power of the battery depending on the accumulated discharge of the battery while the vehicle travels, and detects the correlation between the degradation rate and the accumulated discharge.

Figure 1:
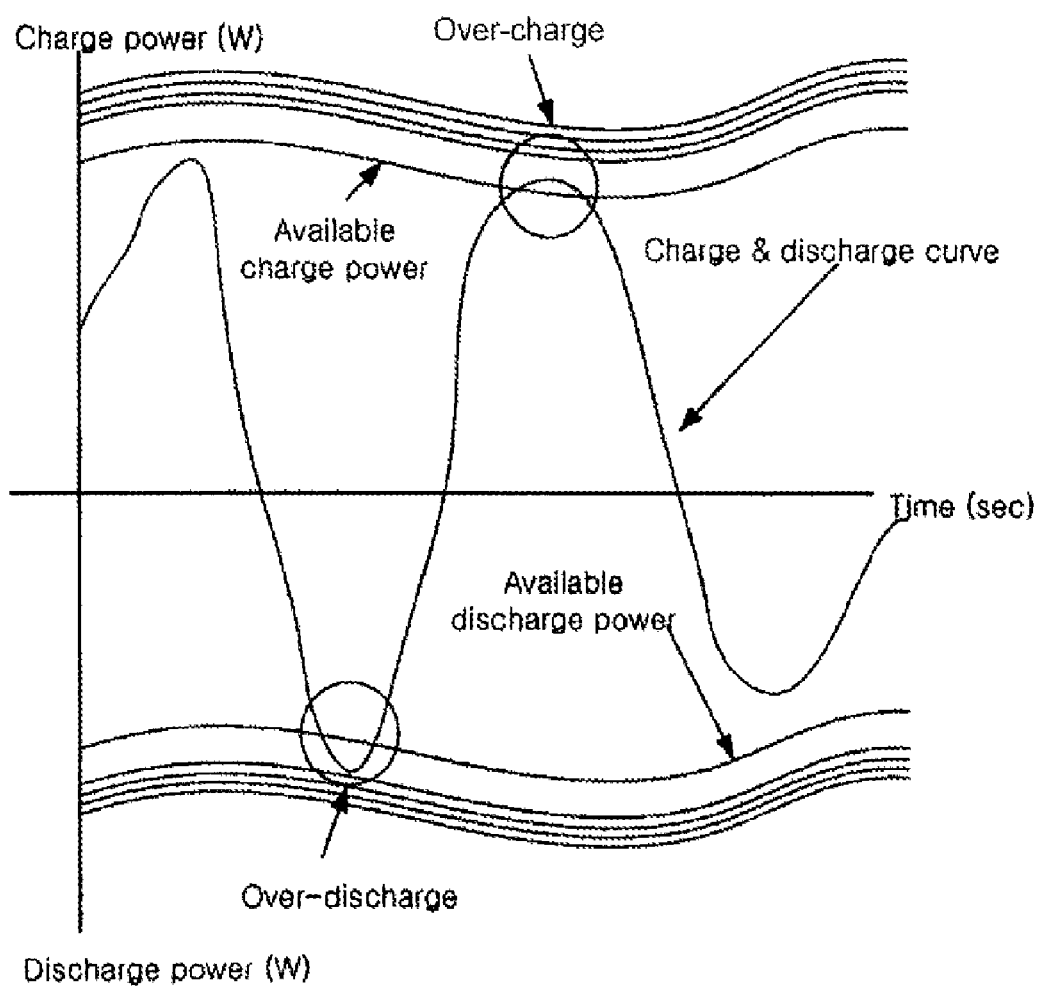
FIG. 1 is a graph showing a case where over-charge or over-discharge takes place at a battery cell.
Figure 2:
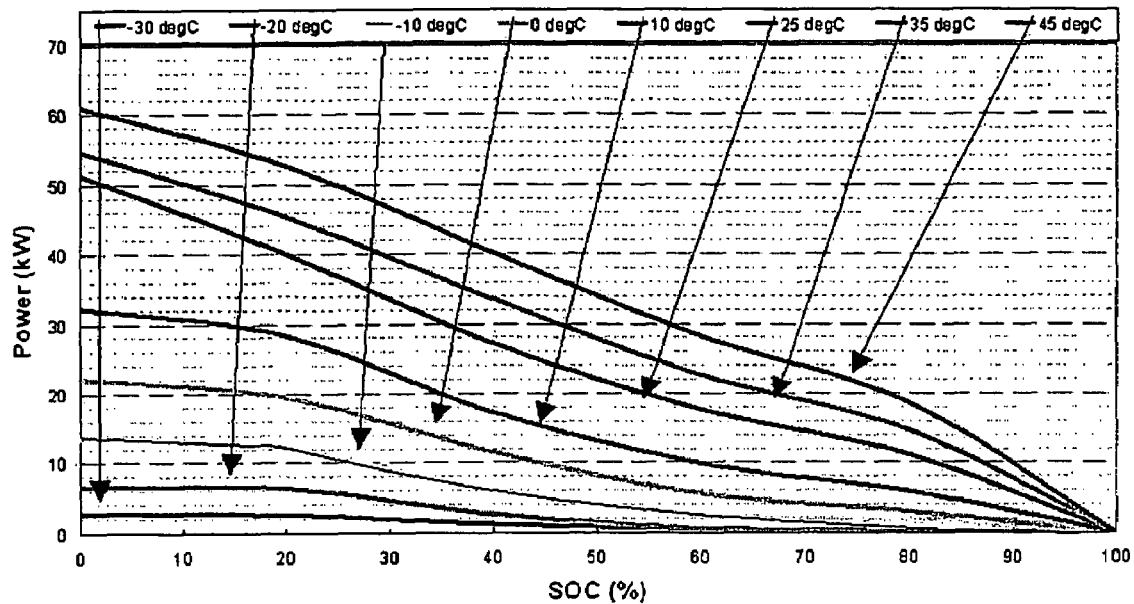
FIGS. 2 and 3 illustrate characteristics of charge power and discharge power according to temperature and a state of charge (SOC).
Figure 3:
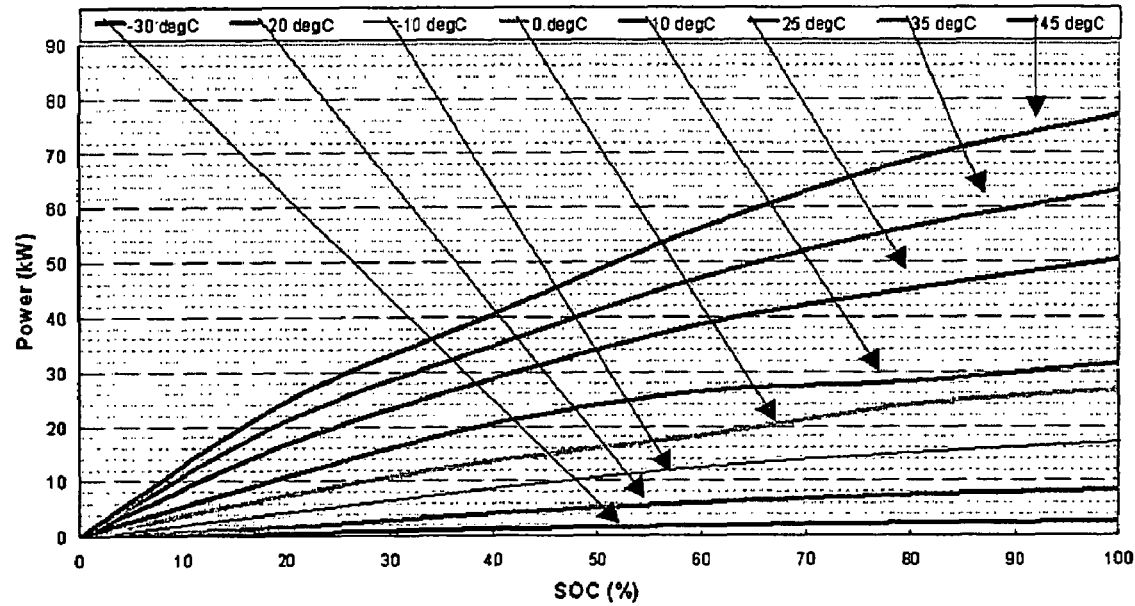

The charge power and the discharge power are expressed according to the temperature and SOC as in graphs of FIGS. 2 and 3. Thus, the power at a certain temperature can be approximated by Equation (2).

$$\text{Power} = C_0 + C_1 * \text{SOC}^1 + C_2 * \text{SOC}^2 + C_3 * \text{SOC}^3 + C_4 * \text{SOC}^4 + C_5 * \text{SOC}^5 \quad (2)$$

In Equation (2), $C_x$ is the constant, and $\text{SOC}^x$ refers to SOC to the x-th power. $C_x = F(\text{temp})_x$, and is determined by temperature.

$C_x$ can be approximated by Equation (3).

$$C_x = F(\text{temp})_x = D_0 + D_1 * \text{temp}^1 + D_2 * \text{temp}^2 \quad (3)$$

In Equation (3), $D_x$ is the invariable constant, and $\text{temp}^x$ refers to temp to the x-th power.

The charge power and the discharge power can express the maximum power '$\text{Power}_{max}$' of the battery from the correlation between temperature and SOC, as in Equation (4).

$$\text{Power}_{max} = F(\text{SOC}, \text{temp}, \text{accumulated discharge Ah}) \quad (4)$$
$$= F(\text{SOC}, \text{temp}) \times F(\text{accumulated discharge Ah})$$

In Equation (4), F(accumulated discharge Ah) indicates the degradation rate of the battery according to the traveling of the vehicle.

Figure 4:
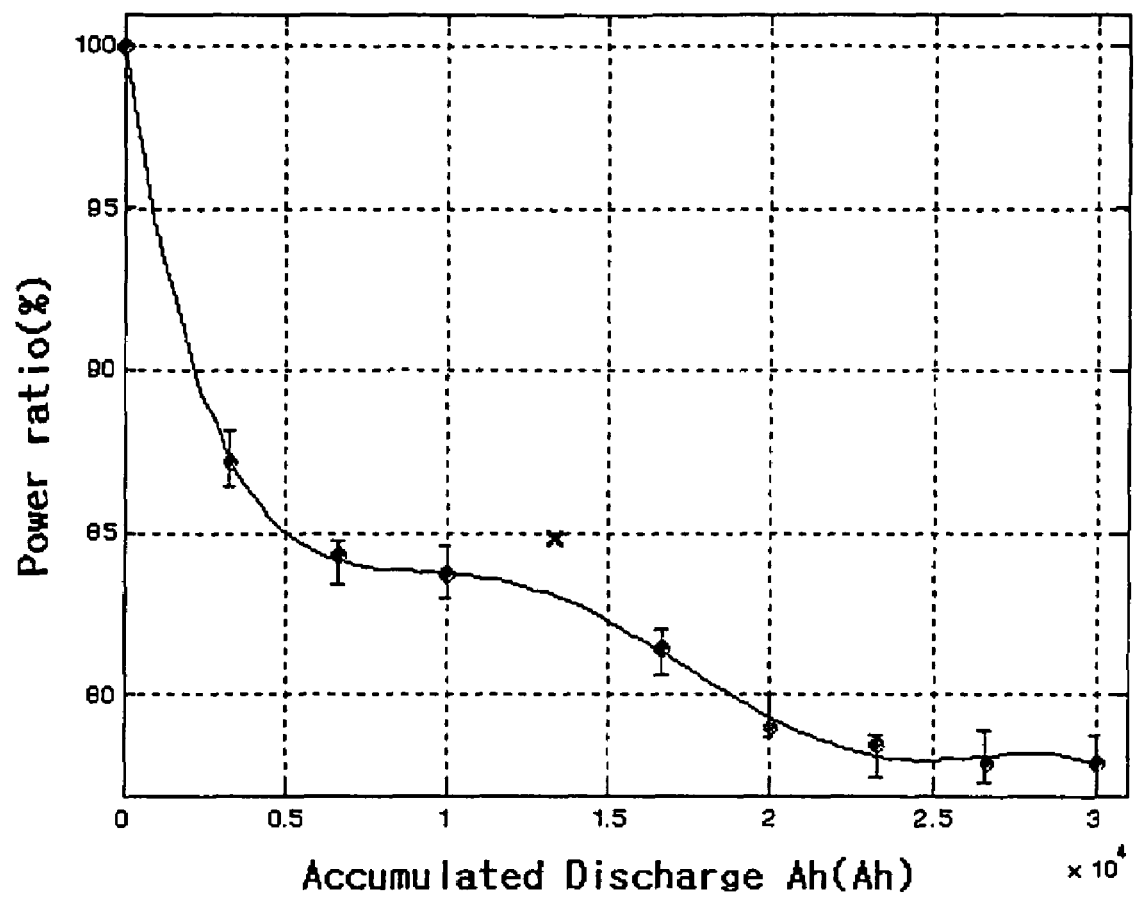
FIG. 4 illustrates a characteristic of a degradation rate of a battery according to accumulated discharge Ah.

Generally, the battery is degraded in proportion to its quantity of use. This has a characteristic as shown in FIG. 4. This characteristic is named a degradation rate of the battery. The degradation rate of the battery is approximated by Equation (5).

$$F(\text{accumulated discharge } Ah) = C_5 k^5 + C_4 k^4 + C_3 k^3 + C_2 k^2 + C_1 k + C_0 \quad (5)$$

In Equation (5), $C_5$ through $C_0$ are the constant, and k is within the range of [0, 300000] and is changed into and input as a value of the range of [−1, 1] when it is input into the function as an input value.

An example of calculating the degradation rate according to Equation (5) is as follows: F(accumulated discharge Ah)=−16.3986k⁵+15.0026k⁴+13.3074k³−8.38689k²−7.96289k+82.3028.

Therefore, the maximum power of the battery can be approximated by Equation (6) as follows.

$$\text{Power}_{max} = \{F(\text{temp})_5 \times \text{SOC}^5 + F(\text{temp})_4 \times \text{SOC}^4 + F(\text{temp})_3 \times \text{SOC}^3 + F(\text{temp})_2 \times \text{SOC}^2 + F(\text{temp})_1 \times \text{SOC} + F(\text{temp})_0\} \times (C_5 k^5 + C_4 k^4 + C_3 k^3 + C_2 k^2 + C_1 k + C_0) \quad (6)$$

Now, an exemplary embodiment of the present invention will be described, in which the maximum power of the battery is estimated according to Equation 6, and the charge power and discharge power of the battery are adjusted using the estimated maximum power and voltage of the battery.

Figure 5:
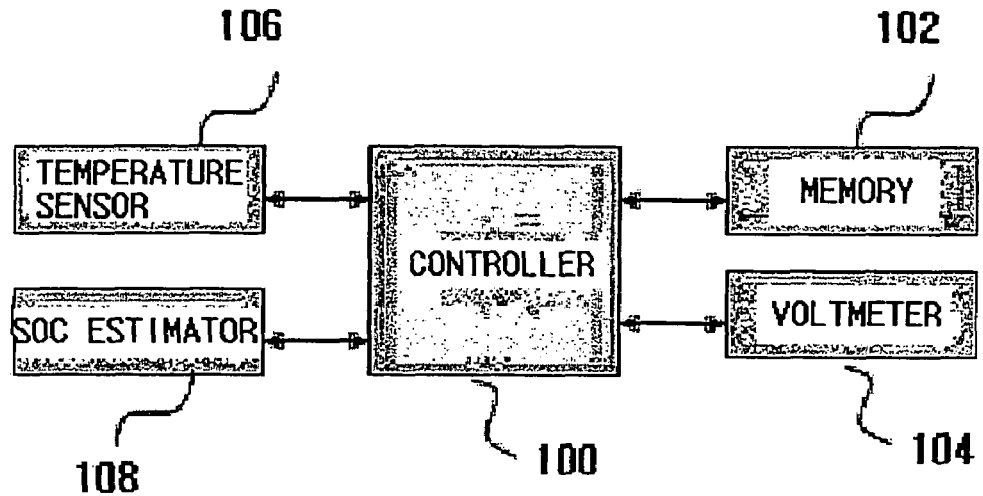
FIG. 5 illustrates a construction of a battery control apparatus according to an exemplary embodiment of the present invention.

First, a construction of a battery control apparatus to which the present invention can be applied will be described with reference to FIG. 5.

A controller 100 performs a process of adjusting the charge and discharge power of a battery according to an exemplary embodiment of the present invention. In order words, the controller 100 estimates the maximum power of the battery in consideration of temperature, SOC, and a degradation rate according to Equation 6, measures voltage of the battery, and adjusts the charge and discharge power of the battery using the maximum power and the voltage of the battery.

A memory 102 stores various information including a processing program of the controller 100, and particularly information on a voltage limit of the battery cell or pack which corresponds to the each maximum power of the battery according to an exemplary embodiment of the present invention.

A voltmeter 104 measures the voltage of the corresponding battery pack or cell, and provides the measured voltage to the controller 100.

A temperature sensor 106 measures temperature, and provides the measured temperature to the controller 100.

A SOC estimator 108 estimates an SOC of the corresponding battery, and provides the estimated SOCt to the controller 100.

Now, a method applicable to the battery control device according to an exemplary embodiment of the present invention will be described in detail.

Figure 6:
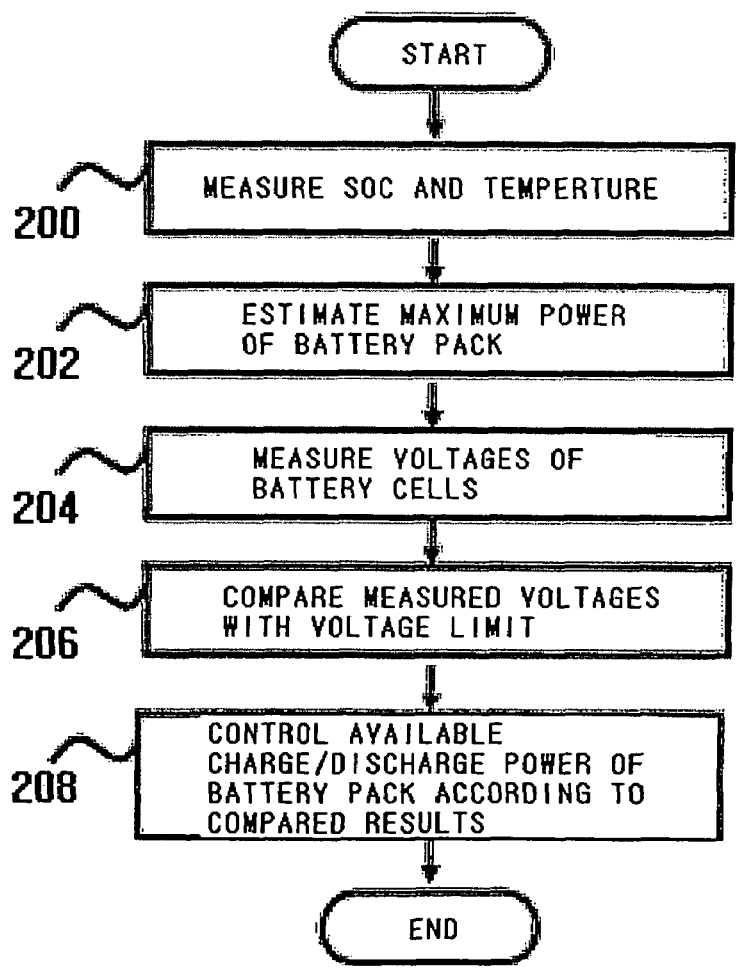
FIGS. 6 and 8 are flowcharts of a method for controlling the discharge or charge power of a battery pack according to the present invention.

Further, a method of using the voltage measured from the battery cell will be described with reference to FIG. 6.

The controller 100 measures temperature and SOC by means of the temperature sensor 106 and the SOC estimator 108, and estimates the maximum power of the battery pack according to Equation 6 (S200 and S202).

Thereafter, the controller 100 measures voltage of the battery cell by means of the voltmeter 104 (S204).

When the voltage of the battery cell is measured, the controller 100 compares a voltage limit corresponding to the estimated maximum power of the battery which is pre-stored in the memory 102 with the measured voltages of the battery cell (S206). When at least one of the measured voltages is higher than the preset voltage limit, the controller decreases available charge and discharge power of the battery pack. In contrast, when at least one of the measured voltages is lower than the preset voltage limit, the controller increases the available charge and discharge power of the battery pack (S208). Increase and decrease widths of the available charge and discharge power can be determined in advance, and preferably within a range of about 2 to 10%.

Figure 7:
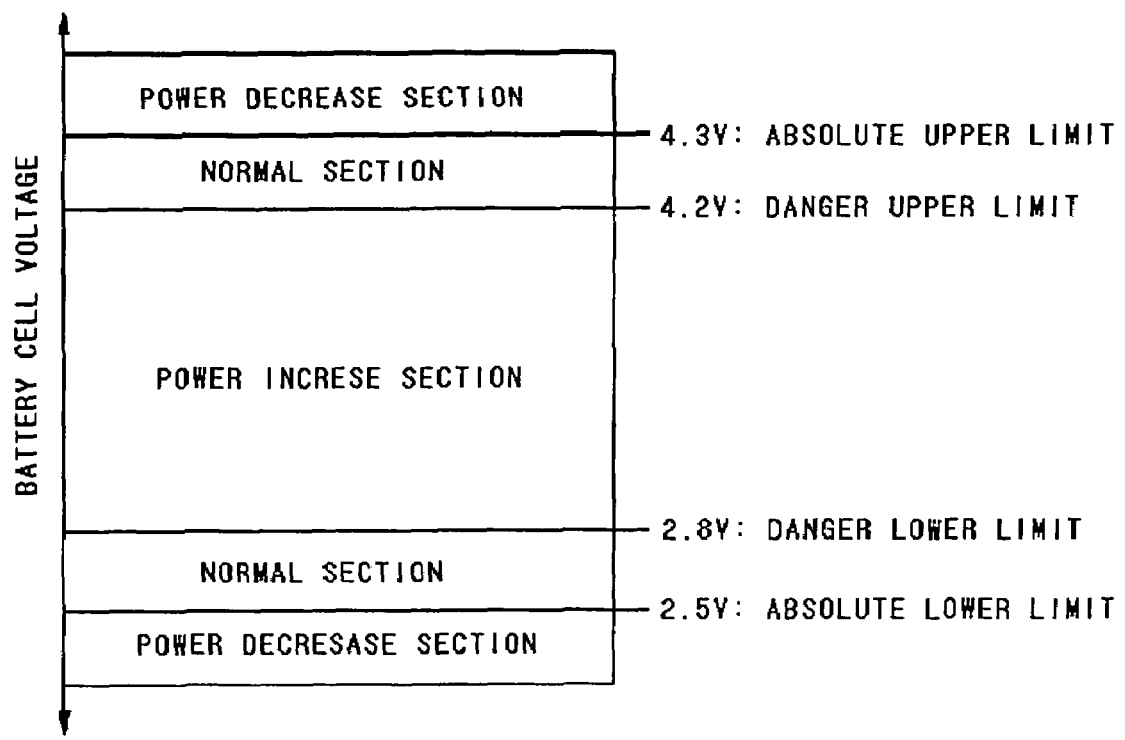
FIG. 7 schematically illustrates available voltage of each cell in a battery pack.

For more detail description, available voltages of the battery cells in the battery pack are denoted in FIG. 7. The available voltages are defined for guaranteeing safety and lifetime of the battery cells during operation. As shown, the available voltages of the battery pack, for example, available from LG Chemical Company have a range of 2.5V to 4.3V. The range is varied depending on company, battery type, and battery version.

When charged with the estimated power of the battery, the controller 100 decreases the charge power if the cell voltage is higher than 4.3V, and increases the charge power if the cell voltage is lower than 4.2V. In contrast, when discharged, the controller 100 decreases the discharge power if the cell voltage is lower than 2.5V, and increases the discharge power if the cell voltage is higher than 2.8V.

At this time, according to an exemplary embodiment of the present invention, the power increase and decrease widths during charging and discharging are controlled within a range of 2 to 10%.

In this manner, when the battery cell voltage deviates from the voltage limit during charging or discharging, the power of the battery is controlled so as to eliminate the deviation of the batter cell voltage. If the battery cells connected in series are well balanced, and the SOC and temperature are accurately measured, the cell voltage does not exceed the available value within the estimated power during charging. Nevertheless, if the battery cell voltage exceeds the voltage limit, this can be determined that the power estimation goes wrong due to a certain factor. When the battery cell voltage continues to exceed the voltage limit, detonation or fire may take place. Hence, the controller decreases the power of the battery, thereby decreasing the battery cell voltage below the voltage limit.

Figure 8:
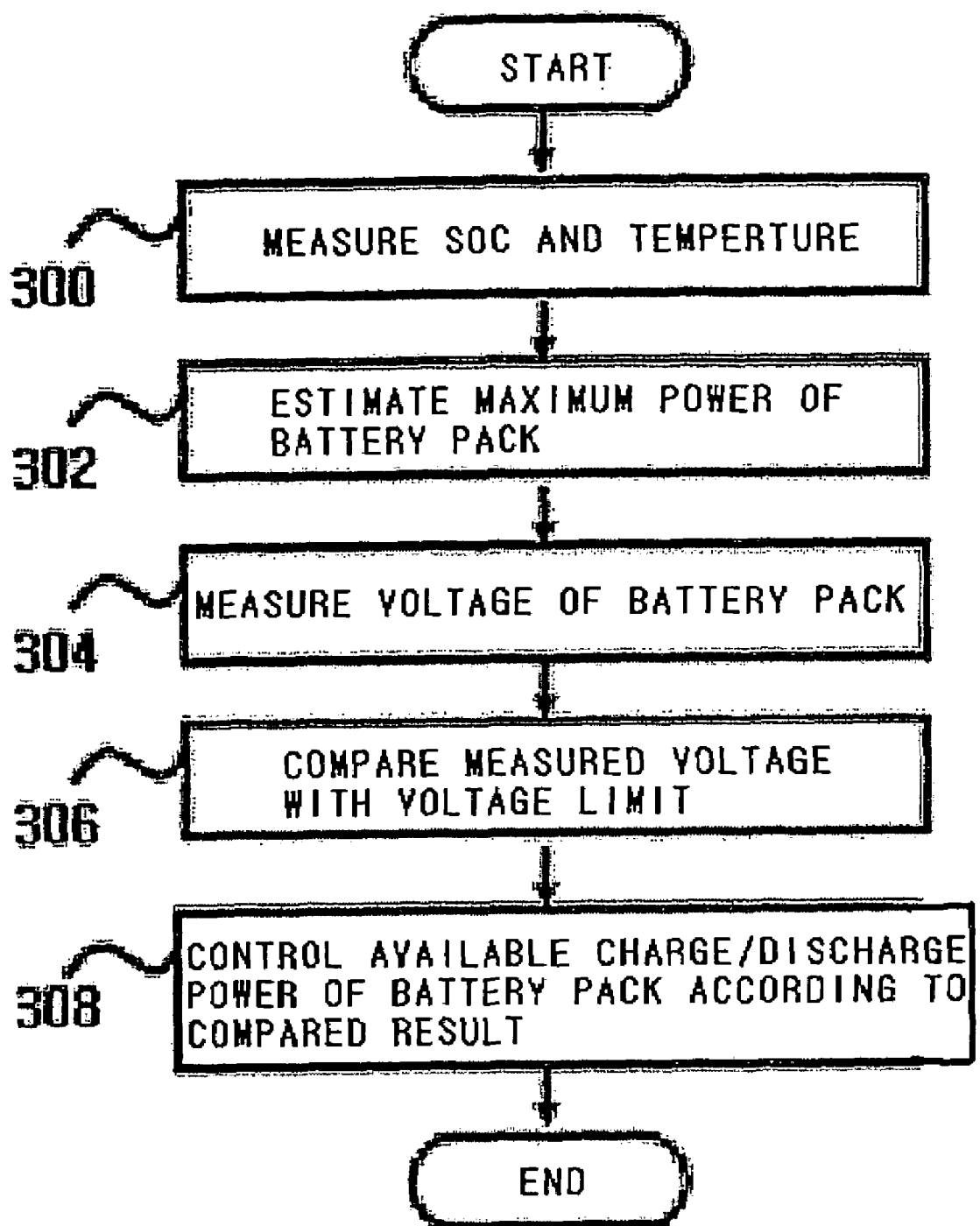

Another embodiment for controlling the discharge or charge power of a battery pack according to the present invention will be described with reference to FIG. 8.

The controller 100 measures temperature and SOC by means of the temperature sensor 106 and the SOC estimator 108, and estimates the maximum power of the battery pack according to Equation 6 (S300 and S302).

Thereafter, the controller 100 measures voltage of the battery pack by means of the voltmeter 104 (S304).

When the voltage of the battery pack is measured, the controller 100 compares a voltage limit of the battery pack which is pre-stored in the memory 102 with the measured voltage of the battery pack (S306). If the measured voltage is higher than the voltage limit corresponding to the estimated maximum power of the battery, the controller decreases available charge and discharge power of the battery pack. In contrast, if the measured voltage is lower than the voltage limit, the controller increases available charge and discharge power of the battery pack (S308). Increase and decrease widths of the available charge and discharge power can be determined in advance, and preferably within a range of about 2 to 10%.

INDUSTRIAL APPLICABILITY

According to the present invention, when a performance difference between battery cells is occurred, the power of the battery may be controlled based on the battery cells having low performance, so that the over-charge and over-discharge of the battery cells can be prevented. Thus, it is possible to prevent sharp degradation of the battery due to the over-charge and over-discharge of the battery cells, and to increase the lifetime of the battery pack.

While this invention has been described in connection with what is presently considered to be the most practical and exemplary embodiment, it is to be understood that the invention is not limited to the disclosed embodiment and the drawings, but, on the contrary, it is intended to cover various modifications and variations within the spirit and scope of the appended claims.

The invention claimed is:

1. A method for controlling discharge or charge power of a battery, the method comprising:
estimating maximum power of the battery using temperature and SOC of the battery;
measuring voltage of a battery cell or pack;
checking whether or not the measured voltage of the battery cell or pack deviates from a preset voltage limit corresponding to the estimated maximum power of the battery; and
when the measured voltage of the battery cell or pack deviates from the preset voltage limit, controlling the discharge or charge power of the battery so that the voltage of the battery cell or pack is adjusted into the preset voltage limit.

2. The method according to claim 1, wherein the maximum power of the battery is calculated by a function obtained from a correlation between a state of charge (SOC) of the battery, a temperature and the maximum power, and a function defining a degradation rate of the battery, which is obtained from a correlation between accumulated discharge Ah and the maximum power of the battery according to the following equation:

$$Power_{max} = F(SOC, temp) \times F(\text{accumulated discharge } Ah).$$

3. The method according to claim 1, wherein the controlling of the discharge or charge power of the battery comprises:
when the measured voltage is higher than the voltage of the preset voltage limit range, decreasing available charge and discharge power of the battery pack; and
when the measured voltage is lower than the voltage of the preset voltage limit range, increasing the available charge and discharge power of the battery pack.

4. A battery control apparatus comprising:
a temperature sensor which measures temperature of a battery;
a state of charge (SOC) estimator which estimates the SOC of a battery;
a voltmeter which measures voltage of a battery cell or pack; and
a controller which:
estimates maximum power of the battery using the temperature and the SOC;
measures the voltage of the battery cell or pack by means of the voltmeter;
checks whether or not the measured voltage of the battery cell or pack deviates from a preset voltage limit corresponding to the estimated maximum power of the battery; and when the voltage of the battery cell or pack deviates from the preset voltage limit, controls discharge or charge power of the battery so that the voltage of the battery cell or pack is adjusted into the preset voltage limit.

5. The battery control apparatus according to claim 4, wherein the maximum power of the battery is calculated by a function obtained from a correlation between the SOC of the battery, the temperature and the maximum power of the battery, and a function defining a degradation rate of the battery, which is obtained from a correlation between accumulated discharge Ah and the maximum power of the battery according to the following equation:

$$Power_{max} = F(SOC, temp) \times F(\text{accumulated discharge } Ah).$$

6. The battery control apparatus according to claim 4, wherein the controlling of the discharge or charge power of the battery is performed by:
when the measured voltage is higher than the voltage of the preset voltage limit range, decreasing available charge and discharge power of the battery pack; and
when the measured voltage is lower than the voltage of the preset voltage limit range, increasing the available charge and discharge power of the battery pack.

* * * * *